United States Patent
Nieuwlands

(10) Patent No.: US 10,536,997 B2
(45) Date of Patent: Jan. 14, 2020

(54) DEVICE FED VIA BALLAST FOR PRODUCING LIGHT

(71) Applicant: SIGNIFY HOLDING B.V., Eindhoven (NL)

(72) Inventor: Eric Johannus Hendricus Cornelis Maria Nieuwlands, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/550,609

(22) PCT Filed: Feb. 11, 2016

(86) PCT No.: PCT/EP2016/052886
§ 371 (c)(1),
(2) Date: Aug. 11, 2017

(87) PCT Pub. No.: WO2016/128500
PCT Pub. Date: Aug. 18, 2016

(65) Prior Publication Data
US 2018/0035496 A1 Feb. 1, 2018

(30) Foreign Application Priority Data
Feb. 13, 2015 (EP) .................... 15155073

(51) Int. Cl.
*H05B 37/02* (2006.01)
*H05B 33/08* (2006.01)

(52) U.S. Cl.
CPC .................... *H05B 33/08* (2013.01)

(58) Field of Classification Search
CPC ............... H05B 37/02; H05B 37/0272; H05B 33/0845; H05B 33/0848; Y10S 323/905; Y10S 362/80
(Continued)

(56) References Cited

U.S. PATENT DOCUMENTS 7,880,405 B2   2/2011   Chitta et al.
8,452,554 B2   5/2013   Jonsson
(Continued)

FOREIGN PATENT DOCUMENTS

WO        2014002021 A1   1/2014

*Primary Examiner* — Alexander H Taningco
*Assistant Examiner* — Kurtis R Bahr
(74) *Attorney, Agent, or Firm* — Daniel J. Piotrowski

(57) ABSTRACT

Devices (1) for producing light comprise inputs (11) for receiving feeding signals via ballasts (2) designed for fluorescent tubes to be replaced by non-fluorescent tubes, drivers (12) for driving light circuits (13), first receivers (14) for receiving definition signals defining features of the ballasts (2), and controllers (15) for, in response to receptions of the definition signals, adapting functions of the devices (1). The functions may comprise reporting functions, whereby apparatuses (3) are informed by the devices (1) about amounts of consumed power of the devices (1) and amounts of consumed power of the ballasts (2). Then, for example in dimming situations, overviews of total amounts of consumed power are realized. The functions may comprise driving functions whereby the light circuits (13) are driven in accordance with requirement data of the ballasts (2). Then, for example in dimming situations, first dimming levels may be forbidden and second dimming levels may be allowed.

19 Claims, 2 Drawing Sheets

(58) Field of Classification Search
USPC .................. 315/307, 291, 224, 308; 362/800
See application file for complete search history.

(56) References Cited

U.S. PATENT DOCUMENTS

| | | |
|---|---|---|
| 8,527,105 B1 | 9/2013 | Choong et al. |
| 8,779,695 B2 | 7/2014 | Saes et al. |
| 2002/0060526 A1 | 5/2002 | Timmermans et al. |
| 2008/0197786 A1 | 8/2008 | Schaible et al. |
| 2010/0118148 A1 | 5/2010 | Lee |
| 2010/0244721 A1* | 9/2010 | Shloush ................ H05B 41/28 315/247 |
| 2010/0251157 A1 | 9/2010 | Kpenv |
| 2011/0133655 A1 | 6/2011 | Recker et al. |
| 2012/0043909 A1 | 2/2012 | Bloom |
| 2012/0229040 A1* | 9/2012 | Brown ............... H05B 33/0824 315/200 R |
| 2013/0200807 A1* | 8/2013 | Mohan .................. H05B 37/02 315/151 |
| 2015/0198290 A1* | 7/2015 | Segers ............... H05B 33/0827 315/191 |

* cited by examiner

DEVICE FED VIA BALLAST FOR PRODUCING LIGHT

CROSS-REFERENCE TO PRIOR APPLICATIONS

This application is the U.S. National Phase application under 35 U.S.C. § 371 of International Application No. PCT/EP2016/052886, filed on Feb. 11, 2016 which claims the benefit of European Patent Application No. 15155073.8, filed on Feb. 13, 2015. These applications are hereby incorporated by reference herein.

FIELD OF THE INVENTION

The invention relates to a device for producing light. The invention further relates to a method. An example of such a device is a retrofit tube for replacing a fluorescent tube while keeping a ballast designed to be used in combination with the fluorescent tube.

BACKGROUND OF THE INVENTION

US 2002/0060526 A1 discloses a light tube comprising light emitting diodes for replacing a fluorescent tube.

When replacing an old, fluorescent tube by a new, non-fluorescent tube, while keeping an old ballast designed for the fluorescent tube, the old ballast is clearly not designed to be used in combination with the new, non-fluorescent tube.

US 2012/0229040 A1 discloses a method and apparatus to facilitate coupling an LED-based lamp to a fluorescent light fixture.

US 2012/0043909 A1 discloses an LED luminaires power supply.

SUMMARY OF THE INVENTION

It is an object of the invention to provide an improved device. It is a further object of the invention to provide an improved method.

According to a first aspect, a device is provided for producing light, the device comprising
  an input for receiving a feeding signal via a ballast, the feeding signal being configured to feed the device,
  a driver for driving a light circuit for producing the light,
  a first receiver for receiving a definition signal, the definition signal being configured to define at least a feature of the ballast, and
  a controller for, in response to a reception of the definition signal, adapting a function of the device, the function of the device comprising a reporting function of the device, the device further comprising
  a transmitter for transmitting an information signal to an apparatus.

An input of a device for producing light receives a feeding signal via a ballast. The feeding signal feeds the device. A driver in the device drives a light circuit, that produces the light. The light circuit comprises for example a non-fluorescent circuit. The ballast, that is designed to be used in combination with a fluorescent circuit, is kept.

A first receiver in the device receives a definition signal, that defines (a feature of) the ballast. The definition signal is usually a wireless signal such as for example a radio frequency signal or an infrared signal, without having excluded other kinds of wireless signals and without having excluded kinds of wired signals arriving through electrical or optical conductors. The feeding signal and the definition signal are different from each other. A controller in the device is informed via the first receiver of a reception of the definition signal and in response adapts a function of the device.

By having informed the device of (the feature of) the ballast, which ballast is not designed to be used in combination with this device, a function of the device can be adapted, for example to improve a use of the device and/or to improve a use of the ballast and/or to improve a use of a combination of the ballast and the device and/or to improve a cooperation between the ballast and the device. This is a great technical advantage.

A ballast can be a passive magnetic ballast or an active electronic ballast or any other kind of converter.

The function of the device may comprise a reporting function of the device, whereby an information signal is transmitted to an apparatus. So, in this case, the reporting function of the device comprises a transmission of an information signal from the device to an apparatus. A transmitter in the device transmits the information signal to the apparatus. The information signal may be transmitted wirelessly in the form of for example a radio frequency signal or an infrared signal, without having excluded other kinds of wireless transmissions and without having excluded kinds of wired transmissions through electrical or optical conductors.

An embodiment of the device is defined by an adaptation of the function of the device comprising an adaptation of the information signal, the adapted information signal defining an amount of consumed power of the device and an amount of consumed power of the ballast separately from each other, or defining a sum of the amounts of consumed power.

The device knows its own amount of consumed power. By having informed the device of (the feature of) the ballast, the device can look up and/or calculate an amount of consumed power of the ballast, and transmit the information signal, that defines the amount of consumed power of the device and that defines the amount of consumed power of the ballast, to the apparatus. As a result, the apparatus can get a better overview of a total amount of consumed power.

For example in buildings, hundreds of devices or more report their amounts of consumed power to apparatuses such as management systems. In such environments, it becomes more and more important to have a good overview of a total amount of consumed power. These management systems do sometimes not know when a device is switched on or off. But the device always knows when it is switched on or off and can inform the apparatus about the amount of power consumed by the device itself as well as about the amount of power consumed by the ballast. The information signal transmitted from the device to the apparatus may comprise a definition of the amount of consumed power of the device and a definition of the amount of consumed power of the ballast separately from each other, or may comprise a definition of a sum of the amounts of consumed power. An amount of consumed power is usually an amount of power consumed during a particular time-interval.

An embodiment of the device is defined by the feature of the ballast comprising a type of ballast, the device further comprising
  a memory for storing power consumption data of the ballast per type of ballast.

According to a first option, the feature of the ballast comprises a type of ballast. In that case, a memory in the device comprises pre-stored power consumption data of the ballast per type of ballast. In other words, at the hand of the type of ballast, the device can look up the power consumption data and calculate an amount of consumed power of the ballast at the hand of the pre-stored power consumption data of the ballast.

An embodiment of the device is defined by the feature of the ballast comprising power consumption data of the ballast, the device further comprising a memory for storing the power consumption data of the ballast.

According to a second option, the feature of the ballast comprises power consumption data of the ballast. In that case, a memory in the device stores the received power consumption data of the ballast. In other words, the device can calculate an amount of consumed power of the ballast at the hand of the received and stored power consumption data of the ballast.

An embodiment of the device is defined by the device further comprising a second receiver for receiving a dimming signal, the dimming signal being configured to define a dimming level of the light circuit, the controller being configured to, in response to a reception of the dimming signal, adjust the driving of the light circuit for dimming purposes.

A second receiver in the device receives a dimming signal that defines a dimming level of the light circuit. The dimming signal is usually a wireless signal such as for example a radio frequency signal or an infrared signal, without having excluded other kinds of wireless signals and without having excluded kinds of wired signals arriving through electrical or optical conductors. Especially in dimming situations, it is important to have a good overview of a total amount of consumed power.

The dimming signal may originate from a remote control that for example uses infrared technology but may alternatively originate from the apparatus such as a management system that for example uses radio-frequency technology. Other technologies are in each case not to be excluded. Similarly, the definition signal may originate from the apparatus but may alternatively originate from the remote control.

An embodiment of the device is defined by the feature of the ballast comprising a type of ballast, the device further comprising a memory for storing power consumption data of the ballast per type of ballast and per dimming level.

According to a third option, the feature of the ballast comprises a type of ballast. In that case, a memory in the device comprises pre-stored power consumption data of the ballast per type of ballast and per dimming level. In other words, at the hand of the type of ballast and the dimming level, the device can look up the power consumption data and calculate an amount of consumed power of the ballast at the hand of the pre-stored power consumption data of the ballast per dimming level.

An embodiment of the device is defined by the feature of the ballast comprising power consumption data of the ballast per dimming level, the device further comprising a memory for storing the power consumption data of the ballast per dimming level.

According to a fourth option, the feature of the ballast comprises power consumption data of the ballast per dimming level. In that case, a memory in the device stores the received power consumption data of the ballast per dimming level. In other words, the device can calculate an amount of consumed power of the ballast at the hand of the received and stored power consumption data of the ballast per dimming level.

An embodiment of the device is defined by the function of the device further comprising a driving function of the device, and an adaptation of the function of the device corresponding with driving the light circuit in accordance with requirement data of the ballast.

The function of the device may comprise a driving function of the device that defines how to drive the light circuit. So, in this case, the driving function of the device comprises the driving of the light circuit. An adaptation of the function of the device may correspond with driving the light circuit in accordance with (minimal) requirement data of the ballast. By having informed the device of (the feature of) the ballast, the device can drive the light circuit in accordance with the (minimal) requirement data of the ballast. Certain ballasts designed to be used in combination with fluorescent tubes require a certain (minimal) current amplitude signal to flow through the ballast or require a certain (minimal) amount of power to be consumed by the device, to operate properly.

An embodiment of the device is defined by the feature of the ballast comprising a type of ballast, the device further comprising a memory for storing the requirement data of the ballast per type of ballast.

According to a fifth option, the feature of the ballast comprises a type of ballast. In that case, a memory in the device comprises pre-stored requirement data of the ballast per type of ballast. In other words, at the hand of the type of ballast, the device can look up the pre-stored requirement data of the ballast per type of ballast and drive the light circuit properly.

An embodiment of the device is defined by the feature of the ballast comprising the requirement data of the ballast, the device further comprising a memory for storing the requirement data of the ballast.

According to a sixth option, the feature of the ballast comprises the requirement data of the ballast. In that case, a memory in the device stores the received requirement data of the ballast. In other words, the device can look up the received and stored requirement data of the ballast and drive the light circuit properly.

An embodiment of the device is defined by the device further comprising a second receiver for receiving a dimming signal, the dimming signal being configured to define a dimming level of the light circuit, the controller being configured to, in response to a reception of the dimming signal, adjust the driving of the light circuit for dimming purposes.

A second receiver in the device receives a dimming signal that defines a dimming level of the light circuit. The dimming signal is usually a wireless signal such as for example a radio frequency signal or an infrared signal, without having excluded other kinds of wireless signals and without having excluded kinds of wired signals arriving through electrical or optical conductors. Especially in dimming situations, it is important to take certain limitations of the ballast into account.

An embodiment of the device is defined by the driving of the light circuit in accordance with the requirement data of the ballast comprising forbidding a first dimming level and allowing a second dimming level. Usually, for certain (fluorescent) ballasts, a first dimming level that corresponds with a relatively low output intensity of the light circuit is to be forbidden, and a second dimming level that corresponds with a relatively high output intensity of the light circuit can be allowed.

An embodiment of the device is defined by the device further comprising the light circuit. The light circuit comprises for example a non-fluorescent circuit, such as for example a light emitting diode circuit, that comprises one or more light emitting diodes of whatever kind and in whatever combination. However, other kinds of light circuits are not to be excluded. For example the reporting function could be introduced advantageously into devices comprising drivers for driving light circuits in the form of fluorescent circuits.

According to a second aspect, a method is provided for operating a device for producing light, the device comprising an input for receiving a feeding signal via a ballast, the feeding signal being configured to feed the device, and a driver for driving a light circuit for producing the light, the method comprising the steps of receiving a definition signal, the definition signal being configured to define at least a feature of the ballast, in response to a reception of the definition signal, adapting a function of the device, the function comprising a reporting function, and transmitting an information signal to an apparatus.

Each (part of an) embodiment of the device defined above can be combined with each (part of an) other embodiment of the device defined above. Embodiments of the method defined above correspond with the embodiments of the device defined above.

A basic idea is that a definition signal configured to define a feature of a ballast is to be used to adapt a function of a device.

A problem to provide an improved device has been solved. Further advantages are that a use of the device can be improved, a use of the ballast can be improved, a use of a combination of the ballast and the device can be improved and/or a cooperation between the ballast and the device can be improved.

These and other aspects of the invention will be apparent from and elucidated with reference to the embodiments described hereinafter.

DETAILED DESCRIPTION OF EMBODIMENTS

Figure 1:
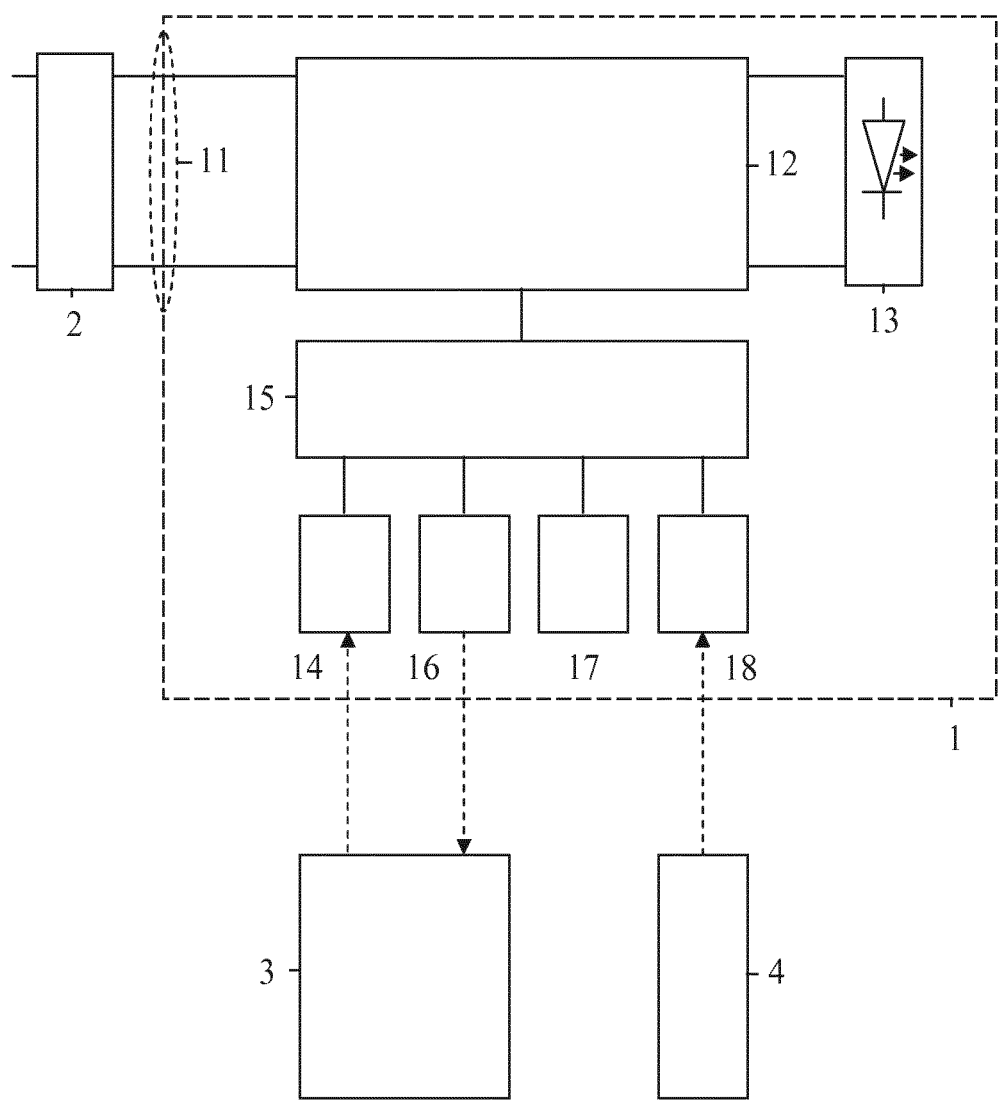
FIG. 1 shows an embodiment of a device.

In the FIG. 1, an embodiment of a device 1 is shown. The device 1 comprises an input 11 for receiving a feeding signal via a ballast 2 from a source not shown such as mains. The feeding signal is configured to feed the device 1. The ballast 2 may be a magnetic ballast or an electronic ballast or any other kind of converter. The device 1 further comprises a driver 12 coupled to the input 11 and to a light circuit 13 for driving this light circuit 13 for producing light. The light circuit 13 may for example be a non-fluorescent circuit for replacing a fluorescent circuit while keeping the ballast 2 that usually is designed to be used in combination with the fluorescent circuit. Preferably, the light circuit 13 may comprise a light emitting diode circuit. Here, the light circuit 13 is shown inside the device 1, but alternatively the light circuit 13 may be located outside the device 1. The device 1 also comprises a first receiver 14 for receiving a definition signal, via a wireless link or a wired link, from an apparatus 3, such as for example a management system for a building.

The definition signal is configured to define at least a feature of the ballast 2. The device 1 further comprises a controller 15 coupled to the driver 12 and to the first receiver 14 for, in response to a reception of the definition signal, adapting a function of the device 1.

This adaptable function of the device 1 may for example comprise a reporting function, whereby an information signal is transmitted to an apparatus 3. Thereto, the device 1 may further comprise a transmitter 16 coupled to the controller 15 for transmitting the information signal to the apparatus 3. An adaptation of the function of the device 1 comprises an adaptation of the information signal. The adapted information signal defines an amount of consumed power of the device 1 and further defines an amount of consumed power of the ballast 2, separately or in combination.

The feature of the ballast 2, as defined by the definition signal, may comprise a type of ballast 2, and the device 1 may further comprise a memory 17 coupled to the controller 15 for storing power consumption data of the ballast 2 per type of ballast 2. In this case, the power consumption data of the ballast 2 is pre-stored in the memory 17, for example during manufacturing or during installation, per type of ballast 2. By having provided the device 1 via the definition signal with the feature of the ballast 2, the device 1 can look up in its memory 17 the power consumption data of the ballast 2 and calculate the amount of consumed power of the ballast 2.

Alternatively, the feature of the ballast 2 may comprise power consumption data of the ballast 2, and the device 1 may further comprise a memory 17 coupled to the controller 15 for storing the received power consumption data of the ballast 2. In this case, the power consumption data of the ballast 2 is downloaded into the memory 17, via the definition signal, for example during installation or thereafter. By having provided the device 1 via the definition signal with the power consumption data of the ballast 2, the device 1 can look up in its memory 17 the power consumption data of the ballast 2 and calculate the amount of consumed power of the ballast 2.

As a result, the information signal transmitted from the device 1 to the apparatus 3 defines an amount of consumed power of the device 1 as well as an amount of consumed power of the ballast 2, either in the form of separate amounts or in the form of a sum of these amounts. This way, the apparatus 3 can get a better overview of the amounts of consumed power, which is a great technical advantage.

The device 1 may be a dimmable device, and may further comprise a second receiver 18 coupled to the controller 15 for receiving a dimming signal from a remote control 4. The dimming signal is configured to define a dimming level of the light circuit 13, and the controller 15 may be configured to, in response to a reception of the dimming signal, adjust a control of the driver 12, to allow said dimming of the light circuit 13. In that case, the feature of the ballast 2 may comprise a type of ballast 2, whereby the memory 17 may store the power consumption data of the ballast 2 per type of ballast 2 and per dimming level. Or, the feature of the ballast 2 may comprise the power consumption data of the ballast 2 per dimming level, whereby the memory 17 may store the power consumption data of the ballast 2 per dimming level. Especially in dimming situations, it is important to have a good overview of a total amount of consumed power.

Figure 2:
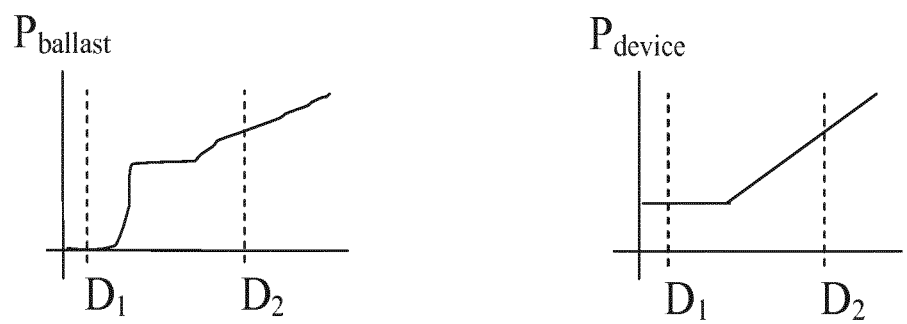
FIG. 2 shows power-consumption-per-dimming-level-graphs.

In the FIG. 2, power-consumption-per-dimming-level-graphs are shown, for a ballast 2 (left graph, vertical axis: power consumption, horizontal axis: dimming level) and for a device 1 (right graph, vertical axis: power consumption, horizontal axis: dimming level). The right graph may correspond with the power consumption data of the device 1, as for example pre-stored in the memory 17 or calculated on-the-fly. The left graph may correspond with the power consumption data of the ballast 2, as for example pre-stored in the memory 17 or downloaded into the memory 17, as all previously discussed, for the FIG. 1.

As an example only, in case the device 1 reports a total power consumption of the ballast 2 and the device 1 once every 24 hours, and the device 1 has recorded that it has produced light at 100% intensity for 8 hours and that it has produced light at 50% intensity for 8 hours and that it has been switched off for 8 hours, all during the last 24 hours, the device 1 can now calculate and report the total power consumption of the ballast 2 and the device 1.

The adaptable function of the device 1 may alternatively and/or in addition for example comprise a driving function of the device 1. An adaptation of the function of the device 1 corresponds with driving the light circuit 13 in accordance with (minimal) requirement data of the ballast 2. The driving function of the device 1 defines how to drive the light circuit 13. By having informed the device 1 of (the feature of) the ballast 2, the device 1 can drive the light circuit 13 in accordance with the (minimal) requirement data of the ballast 2. Certain ballasts 2 designed to be used in combination with fluorescent circuits require a certain (minimal) current amplitude signal to flow through the ballast 2 or require a certain (minimal) amount of power to be consumed by the device 1, to operate properly.

The feature of the ballast 2, as defined by the definition signal, may comprise a type of ballast 2, and the device 1 may further comprise a memory 17 coupled to the controller 15 for storing the requirement data of the ballast 2 per type of ballast 2. In this case, the requirement data of the ballast 2 is pre-stored in the memory 17, for example during manufacturing or during installation, per type of ballast 2. By having provided the device 1 via the definition signal with the feature of the ballast 2, the device 1 can look up in its memory 17 the requirement data of the ballast 2 and control the driver 12 for driving the light circuit 13 properly.

Alternatively, the feature of the ballast 2 may comprise the requirement data of the ballast 2, and the device 1 may further comprise a memory 17 coupled to the controller 15 for storing the received requirement data of the ballast 2. In this case, the requirement data of the ballast 2 is downloaded into the memory 17, via the definition signal, for example during installation or thereafter. By having provided the device 1 via the definition signal with the requirement data of the ballast 2, the device 1 can look up in its memory 17 the requirement data of the ballast 2 and control the driver 12 for driving the light circuit 13 properly.

Again, the device 1 may be a dimmable device, and may further comprise a second receiver 18 coupled to the controller 15 for receiving a dimming signal. The dimming signal is configured to define a dimming level of the light circuit 13, and the controller 15 may be configured to, in response to a reception of the dimming signal, adjust a control of the driver 12, to allow said dimming of the light circuit 13. Especially in dimming situations, it is important to take certain limitations of the ballast 2 into account, as shown in and discussed at the hand of the FIG. 2:

In the FIG. 2, in the right graph, at a first dimming level $D_1$ that corresponds with a relatively low output intensity of the light circuit 13, a power consumption of the device 1 is relatively low. In the right graph, at a second dimming level $D_2$ that corresponds with a relatively high output intensity of the light circuit 13, a power consumption of the device 1 is relatively high. In the left graph, at the first dimming level $D_1$ that corresponds with the relatively low output intensity of the light circuit 13, a power consumption of the ballast 2 is zero. This is an indication that the ballast 2 is not operating properly at this first dimming level $D_1$. In the left graph, at the second dimming level $D_2$ that corresponds with a relatively high output intensity of the light circuit 13, a power consumption of the ballast 2 is relatively high. So, at this second dimming level $D_2$ the ballast 2 is operating properly.

The driving of the light circuit 13 in accordance with the requirement data of the ballast 2 may comprise forbidding the first dimming level $D_1$ and allowing the second dimming level $D_2$. The controller 15 can control the driver 12 such that the first dimming level $D_1$ is forbidden, and for example replaced by another dimming level that is still allowed, and such that the second dimming level $D_2$ is allowed. This way, problems with the ballast 2 are avoided, which is a great technical advantage.

In the previous example, the requirement data is derived from the power consumption data, but alternatively, the requirement data may be provided, stored and/or used independently from any power consumption data.

The links between the apparatus 3 and the remote control 4 on the one hand and the first receiver 14, the transmitter 16 and the second receiver 18 on the other hand can each be any kind of wireless links and/or wired links. The apparatus 3 may also be able to communicate with the second receiver 18 and/or may replace the remote control 4, and the remote control 4 may also be able to communicate with the first receiver 14 and/or the transmitter 16 and/or may replace the apparatus 3. The apparatus 3 and the remote control 4 may be able to communicate with the internet and may be integrated into one entity. The first receiver 14 and the transmitter 16 may be combined into a transceiver, and both first and second receivers 14 and 18 may be combined into one receiver.

So, the device 1 comprises a first receiver 14 for receiving a definition signal, the definition signal being configured to define at least a feature of a ballast 2, and the device 1 comprises a controller 15 for, in response to a reception of the definition signal, adapting a function of the device 1. According to a first group of embodiments, an information signal is transmitted to an apparatus 3, and an adaptation of the function of the device 1 comprises an adaptation of the information signal, the adapted information signal defining an amount of consumed power of the device 1 and defining an amount of consumed power of the ballast 2, separately or in combination. According to a second group of embodiments, an adaptation of the function of the device 1 corresponds with driving a light circuit 13 in accordance with requirement data of the ballast 2. Both groups of embodiments can be advantageously combined, owing to the fact that the definition signal can be used for more than one purpose.

The adapted information signal may define an amount of consumed power absolutely or relatively. The feature of the ballast 2 may define a type of ballast 2 absolutely or relatively. The type of ballast 2 may be a code or a link or an identifier. The feature of the ballast 2 may comprise power consumption data of the ballast 2 absolutely or relatively. In the FIG. 2, an axis may define its values absolutely or relatively. The data disclosed in the FIG. 2 may be presented in an analog or digital way, for example in one or more tables. The reporting function is preferably introduced in a dimming situation but may be advantageously introduced in a non-dimming situation, for example in case an amount of consumed power of the ballast depends on the temperature or the time. The driving function is preferably introduced in a dimming situation, but may be advantageously introduced in a non-dimming situation, for example to avoid that a device and a ballast are used in combination when not being suited to be used in this combination. First and second elements can be coupled indirectly via a third element and can be coupled directly without the third element being in between.

Summarizing, devices 1 for producing light comprise inputs 11 for receiving feeding signals via ballasts 2 designed for fluorescent tubes to be replaced by non-fluorescent tubes, drivers 12 for driving light circuits 13, first receivers 14 for receiving definition signals defining features of the ballasts 2, and controllers 15 for, in response to receptions of the definition signals, adapting functions of the devices 1. The functions may comprise reporting functions, whereby apparatuses 3 are informed by the devices 1 about amounts of consumed power of the devices 1 and amounts of consumed power of the ballasts 2. Then, for example in dimming situations, overviews of total amounts of consumed power are realized. The functions may comprise driving functions whereby the light circuits 13 are driven in accordance with requirement data of the ballasts 2. Then, for example in dimming situations, first dimming levels may be forbidden and second dimming levels may be allowed.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A device for producing light, the device comprising
   an input for receiving a feeding signal via a ballast, the feeding signal being configured to feed the device,
   a driver for driving a light circuit for producing the light,
   a first receiver for receiving from an apparatus remote from the device, a definition signal, the definition signal being configured to define at least a feature of the ballast,
   a second receiver for receiving a dimming signal, the dimming signal being configured to define a dimming level of the light circuit, the controller being configured to, in response to a reception of the dimming signal, adjust the driving of the light circuit for dimming purposes by adjusting a control of the driver,
   a controller for, in response to a reception of the definition signal and the dimming level, adapting a function of the device, the function of the device comprising a reporting function of the device, the reporting function providing an information signal,
   the device further comprising a transmitter for transmitting the information signal to the apparatus; wherein the controller is for adaptation of the information signal, the adapted information signal further includes defining an amount of consumed power of the ballast based on the dimming level of the dimming signal.

2. The device as defined in claim 1, the ballast is designed to be used with a fluorescent circuit, and wherein the light circuit is non-fluorescent circuit, the amount of consumed power of the ballast per the dimming level of the dimming signal is influenced by the adjust of the control of the driver, and
   an adaptation of the function of the device comprising an adaptation of the information signal, the adapted information signal defining an amount of consumed power of the device and the amount of consumed power of the ballast separately from each other, or defining a sum of the amounts of consumed power.

3. The device as defined in claim 2, further comprising
   a memory for storing power consumption data of at least one ballast per type of ballast, and
   wherein the feature of the ballast comprises the type of ballast.

4. The device as defined in claim 2, the feature of the ballast comprising power consumption data of the ballast, the device further comprising
   a memory for storing the power consumption data of the ballast.

5. The device as defined in claim 2, the light circuit is a light emitting diode.

6. The device as defined in claim 5, further comprising
   a memory for storing power consumption data of at least one ballast per type of ballast and per dimming level,
   wherein the feature of the ballast comprises the type of ballast.

7. The device as defined in claim 5, the feature of the ballast comprising power consumption data of the ballast per dimming level, the device further comprising
   a memory for storing the power consumption data of the ballast per dimming level.

8. The device as defined in claim 1, the function of the device further comprising a driving function of the device, and an adaptation of the function of the device corresponding with driving the light circuit in accordance with requirement data of the ballast.

9. The device as defined in claim 8, further comprising
   a memory for storing the requirement data of at least one ballast per type of ballast, and
   wherein the feature of the ballast comprises the type of ballast.

10. The device as defined in claim 8, the feature of the ballast comprising the requirement data of the ballast, the device further comprising
    a memory for storing the requirement data of the ballast.

11. The device as defined in claim 8, the driving of the light circuit in accordance with the requirement data of the ballast comprising forbidding a first dimming level ($D_1$) and allowing a second dimming level ($D_2$).

12. The device as defined in claim 1, the device further comprising the light circuit.

13. A method for operating a device for producing light, the device comprising
    an input for receiving a feeding signal via a ballast designed to be used with a fluorescent circuit, the feeding signal being configured to feed the device, and
    a driver coupled to the input and to a light circuit for driving a light circuit for producing the light, wherein the light circuit is non-fluorescent circuit,
    the method comprising the steps of
    receiving from an apparatus remote from the device, a definition signal, the definition signal being configured to define at least a feature of the ballast, receiving a dimming signal, the dimming signal being configured to define a dimming level of the light circuit, in response to a reception of the dimming signal, adjusting the driving of the light circuit for dimming purposes by adjusting a control of the driver, in response to a reception of the definition signal, adapting a function of the device, the function comprising a reporting function for providing an information signal, transmitting the information signal to the apparatus, and adapting the information signal to further include defining an amount of consumed power of the ballast, wherein the amount of consumed power of the ballast is per based on the dimming level of the dimming signal.

14. A device for producing light, the device comprising:
an input for receiving a feeding signal via a ballast, the feeding signal being configured to feed the device,
a driver for driving a light circuit for producing the light,
a first receiver for receiving a definition signal, the definition signal being configured to define at least a feature of the ballast, and
a controller for, in response to a reception of the definition signal, adapting a function of the device, the function of the device comprising a reporting function of the device, the reporting function providing an information signal, the device further comprising,
a transmitter for transmitting the information signal to an apparatus;
an adaptation of the function of the device comprising an adaptation of the information signal, the adapted information signal defining an amount of consumed power of the device and an amount of consumed power of the ballast separately from each other, or defining a sum of the amounts of consumed power and the device further comprising a memory for storing power consumption data of at least one ballast per type of ballast, and the feature of the ballast comprises the type of ballast, or the device further comprising a memory for storing the power consumption data of the ballast, and the feature of the ballast comprising power consumption data of the ballast.

15. The device as defined in claim 14, the function of the device further comprising a driving function of the device, and an adaptation of the function of the device corresponding with driving the light circuit in accordance with requirement data of the ballast.

16. The device as defined in claim 15, further comprising a memory for storing the requirement data of at least one ballast per type of ballast, and wherein the feature of the ballast comprises the type of ballast.

17. The device as defined in claim 15, the feature of the ballast comprising the requirement data of the ballast, the device further comprising a memory for storing the requirement data of the ballast.

18. The device as defined in claim 15, the driving of the light circuit in accordance with the requirement data of the ballast comprising forbidding a first dimming level (D1) and allowing a second dimming level (D2).

19. The device as defined in claim 14, the device further comprising the light circuit.

* * * * *